(12) United States Patent
Balestra et al.

(10) Patent No.: US 6,687,440 B2
(45) Date of Patent: Feb. 3, 2004

(54) OPTICAL FIBER HAVING AN ELEVATED THRESHOLD FOR STIMULATED BRILLOUIN SCATTERING

(75) Inventors: Chester Lee Balestra, Wildwood, MO (US); Robert Rex Rice, Simi Valley, CA (US)

(73) Assignee: The Boeing Company, Seattle, WA (US)

( * ) Notice: Subject to any disclaimer, the term of this patent is extended or adjusted under 35 U.S.C. 154(b) by 144 days.

(21) Appl. No.: 09/795,156

(22) Filed: Feb. 28, 2001

(65) Prior Publication Data

US 2002/0118935 A1 Aug. 29, 2002

(51) Int. Cl.[7] ................................. G02B 6/02
(52) U.S. Cl. ............... 385/123; 385/128; 385/122; 385/127; 385/141; 385/147; 385/144
(58) Field of Search .................... 385/123, 124, 385/128, 129, 126, 122, 141, 144, 147, 127

(56) References Cited

U.S. PATENT DOCUMENTS 5,170,457 A * 12/1992 Jen ........................... 385/123
5,329,396 A   7/1994  Fishman et al.
5,420,868 A   5/1995  Chraplyvy et al.
5,434,942 A   7/1995  Jackel et al.
5,848,215 A   12/1998 Akasaka et al.

* cited by examiner

Primary Examiner—Robert H. Kim
Assistant Examiner—George Wang
(74) Attorney, Agent, or Firm—Alston & Bird LLP

(57) ABSTRACT

An optical fiber having an elevated threshold for stimulated Brillouin scattering is provided. The optical fiber includes a core and a cladding surrounding the core with both the core and the cladding designed to guide optical waves through the core while anti-guiding acoustic waves. Moreover, the optical fiber includes other features to alter the mode profile of the acoustic waves and/or to further promote their lateral radiation. For example, the optical fiber can include an irregular coating to alter the mode profile of the acoustic waves. In another example, the optical fiber can include a quarter wave layer surrounding the cladding to promote the lateral radiation of the acoustic waves. In order to further alter the mode profile of the acoustic waves, the cladding can also have a lateral thickness that varies irregularly in a lengthwise direction.

11 Claims, 3 Drawing Sheets

US 6,687,440 B2

OPTICAL FIBER HAVING AN ELEVATED THRESHOLD FOR STIMULATED BRILLOUIN SCATTERING

FIELD OF THE INVENTION

The present invention relates generally to optical fibers and, more particularly, to optical fibers having an increased threshold for stimulated Brillouin scattering.

BACKGROUND OF THE INVENTION

In many applications, such as high power fiber optic industrial lasers and scaleable high power fiber optic phased array laser systems, it is desirable to transmit optical signals having substantial amounts of power via optical fibers. Unfortunately, stimulated Brillouin scattering oftentimes limits the amount of power that can be transmitted via an optical fiber such that, even as additional input power is provided, the output power remains relatively fixed at the threshold at which stimulated Brillouin scattering commences.

In general, stimulated Brillouin scattering is a phase-matched parametric amplification process involving the coupling of a optical wave, an acoustic wave and a backward propagating Stokes wave. In this regard, variations in the index of refraction of an optical fiber induced by pressure differences created by an acoustic wave traveling along the optical fiber can cause a portion of the optical wave to be backscattered, thereby creating the backward propagating Stokes wave. The backward propagating Stokes wave essentially robs power from the optical wave so as to limit the power of the optical signals that can be transmitted via the optical fiber. With reference to quantum physics, stimulated Brillouin scattering can therefore be described by the transfer of a photon from the optical wave into a new Stokes photon of lower frequency and the creation of a new phonon that adds to the acoustic wave.

With reference to FIG. 1, as the input power of the signal transmitted via an optical fiber is increased up to the threshold for stimulated Brillouin scattering, the power level of the signals output by the optical fiber similarly increases as evidenced by positive slope of curve 10. Upon reaching the threshold for stimulated Brillouin scattering, however, further increases in the power of the signals transmitted via the optical fiber will not translate into increased power levels of the optical signals output by the optical fiber. Instead, the power level of the optical signals output via the optical fiber will remain at the threshold at which stimulated Brillouin scattering commences as evidenced by the horizontal portion of curve 10, while the additional input power will be transferred to the backward propagating Stokes wave as shown by the positive slope of curve 12.

Parametric processes, such as stimulated Brillouin scattering, are enhanced in guided wave structures in general, and optical fibers in particular, because the waves that interact, i.e., the optical waves, the acoustic waves, and the Stokes waves, are maintained in the core over relatively long distances. Moreover, stimulated Brillouin scattering is particularly apparent in optical fibers that exhibit a significant overlap of the fundamental optical and acoustic modes within the core of the optical fiber. In this regard, an overlap integral is defined as the integral of the product of the acoustic wave amplitude and the optical wave amplitude over the lateral cross-sectional area of the optical fiber. As the overlap integral approaches unity, coupling between the optical waves and the acoustic waves is at a maximum, thereby resulting in a high level of stimulated Brillouin scattering. As depicted in FIG. 2, for example, a conventional optical fiber having a core doped with $GeO_2$ is susceptible to the early onset of stimulated Brillouin scattering since the fundamental optical and acoustic modes have a 67% mode overlap in the core for an optical wavelength of 1.55 microns and an acoustic frequency of 11.25 GHz. Thus, the forward propagating optical wave of such an optical fiber will couple energy into the formation of a longitudinal acoustic wave which, in turn, can reflect a portion of the power carried by the optical wave back toward the source.

In order to avoid the limitations imposed by the threshold at which stimulated Brillouin scattering commences, optical systems are typically designed such that the optical fibers are operated below the threshold for the onset of stimulated Brillouin scattering. As will be apparent, this approach effectively limits the performance and scalability of the optical systems and may effectively prevent the optical system from being utilized for applications demanding high energy levels. Alternatively, some optical systems utilize a plurality of optical fibers such that the total power handling capability of the plurality of optical fibers satisfies the power requirements of the particular application while ensuring that the power of the optical signals transmitted via each optical fiber is below the threshold at which stimulated Brillouin scattering commences. While facilitating the delivery of optical signals having increased power levels, optical systems of this type obviously include an increased number of components, thereby leading to increased costs and increased weight and volume requirements. Thus, it would be desirable to provide an improved technique for optically transmitting relatively large amounts of power, such as power levels that exceed the threshold at which stimulated Brillouin scattering would commence in a typical optical fiber, such that lasers and other high energy optical systems can be developed without requiring the use of multiple optical fibers that unnecessarily increase the weight and volume of the optical system.

SUMMARY OF THE INVENTION

An optical fiber having an elevated threshold for stimulated Brillouin scattering is therefore provided. The optical fiber includes a longitudinally extending core and a cladding surrounding the core and extending lengthwise therealong, wherein both the core and the cladding are specifically designed to guide optical waves through the core while anti-guiding acoustic waves. Moreover, the optical fiber includes other features to alter the mode profile of the acoustic waves and/or to further promote the lateral radiation of at least some of the acoustic waves. The threshold for stimulated Brillouin scattering can therefore be increased relative to a conventional optical fiber since the forward propagating optical wave cannot couple energy into the formation of a longitudinal acoustic wave as readily as in conventional optical fibers due to the anti-guiding of the acoustic waves and the alterations of the mode profile.

The core of the optical fiber of the present invention has a first index of refraction and a first acoustic wave propagation velocity. Similarly, the cladding has a second index of refraction that is less than the first index of refraction of the core and a second acoustic wave propagation velocity that is less than the first acoustic wave propagation velocity of the core. In order for the core and the cladding to have indices of refraction and acoustic wave velocities with the proper relationship, the optical fiber of one embodiment has a core that includes aluminum oxide as a dopant and/or a cladding that includes fluorine or boron oxide as a dopant. As a result of the relationship of the indices of refraction and acoustic wave velocities, optical waves can be guided through the core, while the acoustic waves are radiated away from the core and into the cladding, i.e., the acoustic waves are anti-guided. Due to the guiding of the optical waves and the anti-guiding of the acoustic waves, the fundamental optical and acoustic modes will not overlap as much within the core as in conventional optical fibers and the threshold for stimulated Brillouin scattering will be accordingly increased.

In one embodiment, the optical fiber further includes an irregular coating disposed on the cladding that varies in a lengthwise direction in order to alter the mode profile of the acoustic waves. For example, the irregular coating can be an acoustically dampening material that is acoustically matched to the cladding. As such, acoustic waves that reach the interface of the cladding and the coating will continue to radiate laterally from the cladding into the coating for further dampening. In order to couple the fundamental acoustic mode into higher order acoustic modes which provide little, if any, power to the stimulated Brillouin scattering process and to incoherently scatter acoustic energy back into the cladding and the core, the coating is irregular. For example, the coating can have a lateral thickness that varies randomly in a lengthwise direction. Alternatively, the coating can have a density that varies randomly in a lengthwise direction. Further, the coating can include a plurality of segments having different lengths that are spaced apart in a lengthwise direction. Still further, the coating can include a plurality of segments that are spaced apart in a lengthwise direction by gaps of different lengths. Regardless of the type of irregularity, the coating is designed to change the mode profile of the acoustic waves that reach the interface between the cladding and the coating such that any acoustic waves that are scattered back into the cladding and/or the core will have a negligible influence on the optical waves guided through the core.

According to another embodiment, the optical fiber includes a core and a cladding as described above along with a quarter wave layer disposed on and extending lengthwise along the cladding. In order to promote the lateral or radial radiation of the acoustic waves that reach the interface between the cladding and the quarter wave layer, the quarter wave layer has a thickness that equals an odd multiple of a quarter of a predetermined Brillouin scattering wavelength. By promoting the radial or lateral radiation of the acoustic waves away from the core and cladding of the optical fiber, the threshold at which stimulated Brillouin scattering commences is further increased.

In order to further alter the mode profile of the acoustic waves, the cladding can have a lateral thickness that varies irregularly in a lengthwise direction. Thus, any acoustic waves reflected from one location of the exterior surface of the cladding back toward the core will be out of phase from acoustic waves that may be reflected from the exterior surface of the cladding at other locations along the length of the optical fiber. Accordingly, the irregular lateral thickness of the cladding of the optical fiber of this embodiment further serves to increase the threshold at which stimulated Brillouin scattering commences.

The optical fiber of the present invention therefore provides an increased threshold at which stimulated Brillouin scattering commences. As such, the optical fiber of the present invention can be utilized to deliver optical signals having increased power levels relative to conventional optical fibers and is therefore particularly suitable for applications, such as high power fiber optic industrial lasers and scalable high power fiber optical phased array laser systems, that require the transmission of optical signals having power levels well above the threshold for stimulated Brillouin scattering of conventional optical fibers.

BRIEF DESCRIPTION OF THE DRAWINGS

Figure 1:
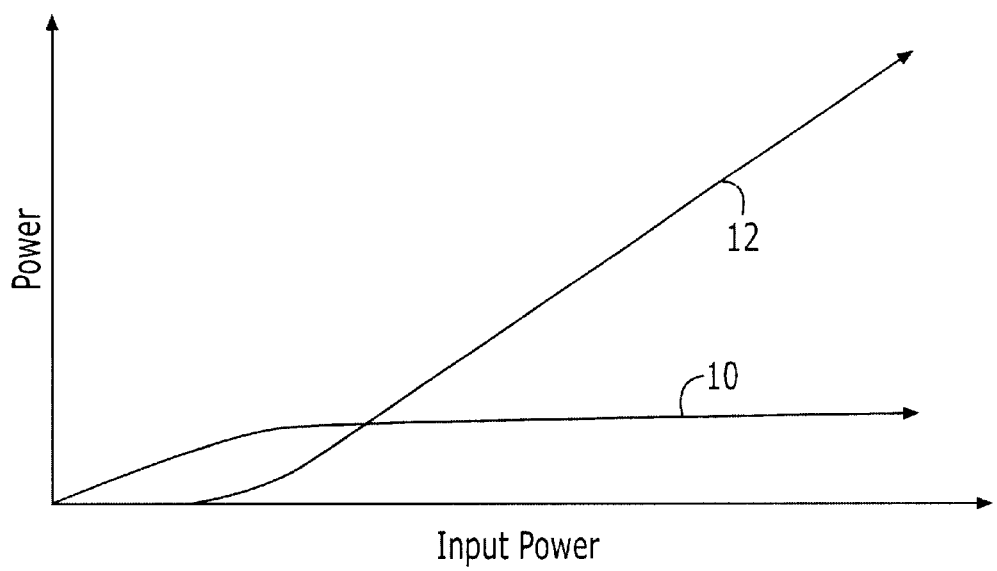
Figure 2:
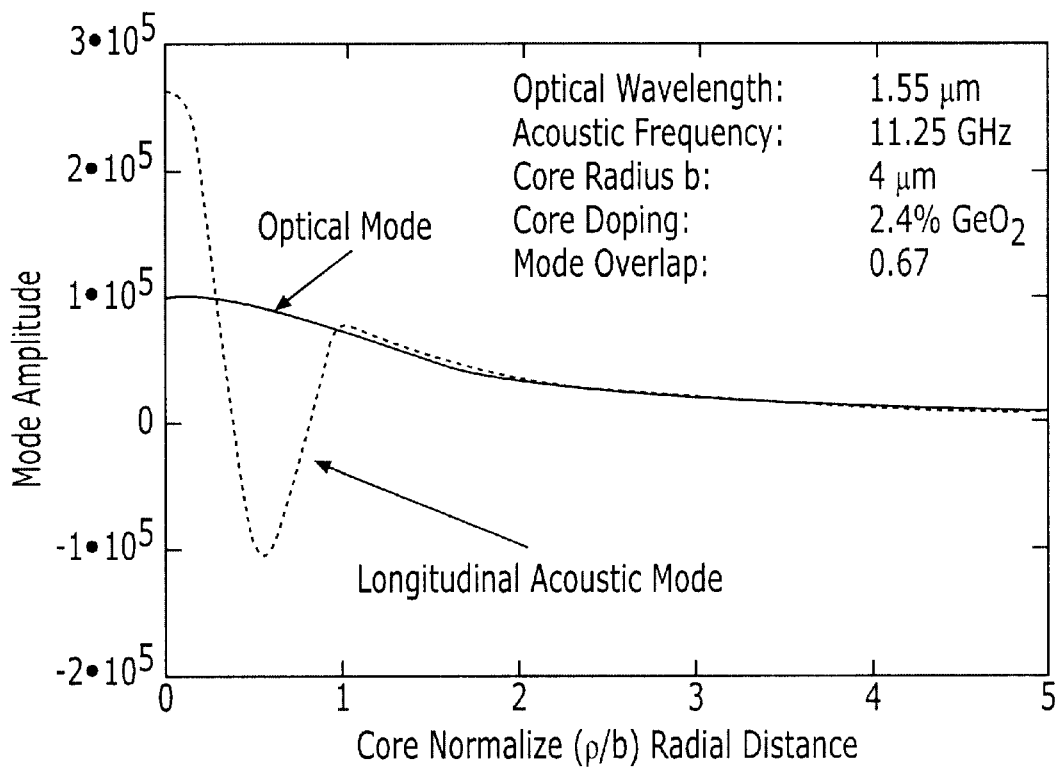
Figure 3:
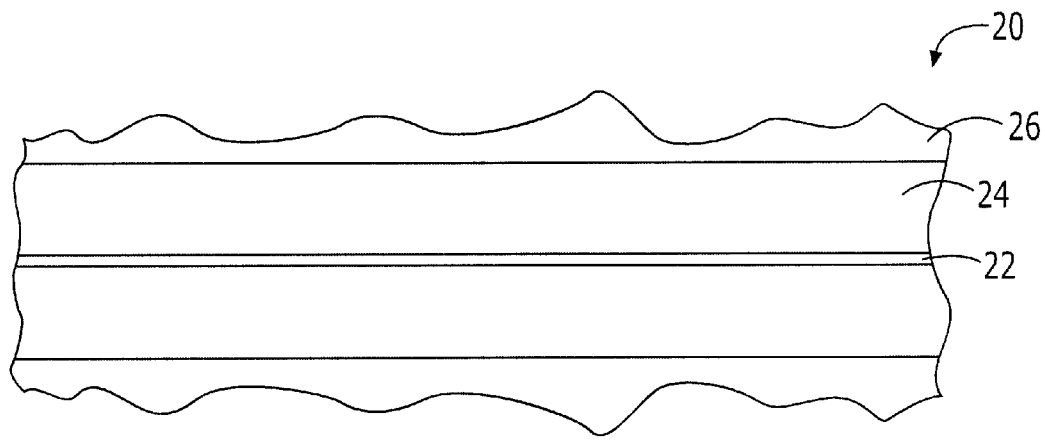
Figure 4:
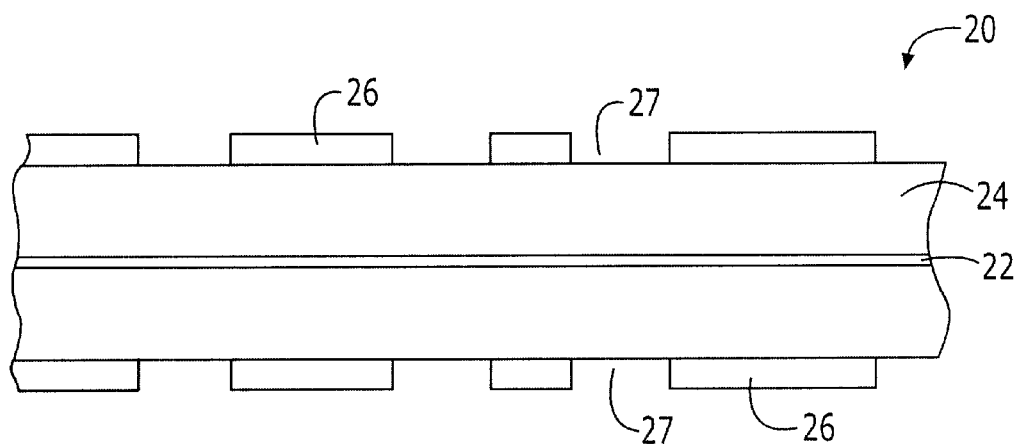
Figure 5:
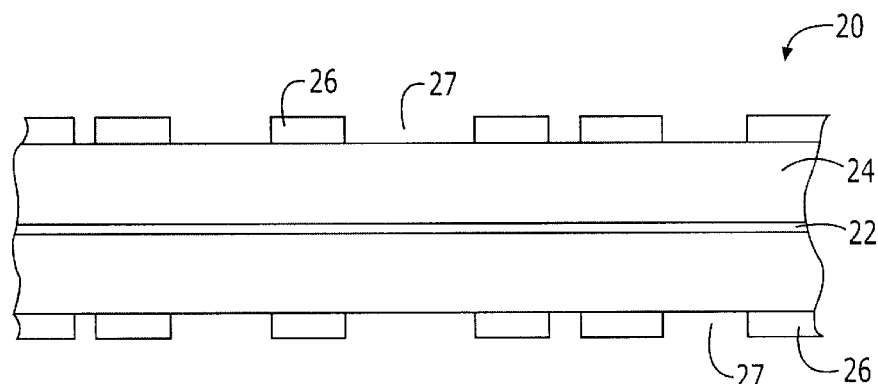
Figure 6:
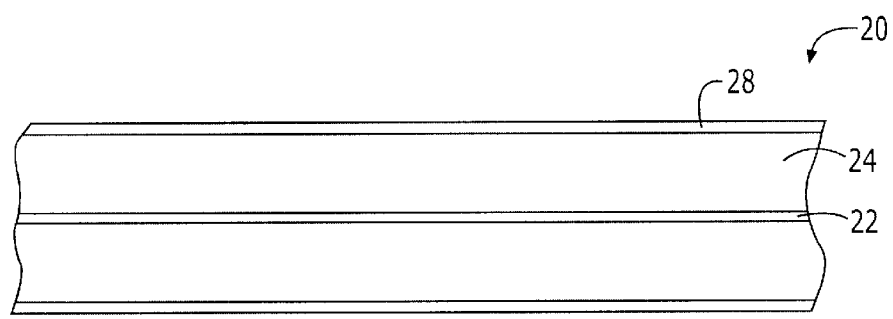
Figure 7:
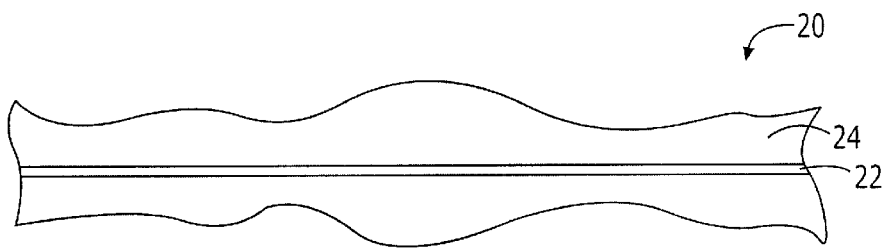

Having thus described the invention in general terms, reference will now be made to the accompanying drawings, which are not necessarily drawn to scale, and wherein:

FIG. 1 is a graph illustrating the transfer of input power from the optical signals propagating along an optical fiber in a forward direction to backscattered optical signals propagating in the opposite direction;

FIG. 2 is a graph depicting the overlap between the fundamental optical and longitudinal acoustic modes of a conventional optical fiber having a core doped with $GeO_2$;

FIG. 3 is a cross-sectional plan view of an optical fiber according to one embodiment of the present invention in which the irregular coating has a lateral thickness that varies randomly in a lengthwise direction;

FIG. 4 is a cross-sectional plan view of an optical fiber according to another embodiment of the present invention in which the irregular coating includes a plurality of segments having different lengths that are spaced apart in a lengthwise direction;

FIG. 5 is a cross-sectional plan view of an optical fiber according to another embodiment of the present invention in which the irregular coating includes a plurality of segments that are spaced apart in a lengthwise direction by gaps of different lengths;

FIG. 6 is a cross-sectional plan view of an optical fiber according to another embodiment of the present invention that includes a quarter wave layer disposed on and extending lengthwise along the cladding; and FIG. 7 is a cross-sectional plan view of an optical fiber of another embodiment of the present invention in which the cladding has a lateral thickness that varies irregularly in a lengthwise direction.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 3, an optical fiber 20 according to one embodiment of the present invention is depicted that exhibits an elevated threshold for stimulated Brillouin scattering relative to conventional optical fibers. The optical fiber includes a longitudinally extending core 22 having a first index of refraction and a first acoustic wave propagation velocity. The optical fiber also includes a cladding 24 surrounding the core and extending lengthwise therealong. Like the core, the cladding includes a second index of refraction and a second acoustic wave propagation velocity.

While both the core 22 and the cladding 24 are typically formed of silica, at least one of the core and the cladding is preferably doped such that the first index of refraction of the core is greater than the second index of refraction and the cladding such that the optical waves and, in particular, the fundamental mode of the optical waves are confined within and guided through the core. According to the present invention, at least one of the core and the cladding are also doped such that the first acoustic wave propagation velocity of the core is greater than the second acoustic wave propagation velocity of the cladding. In this regard, the acoustic wave propagation velocity of a material is determined by the square root of the ratio of material density to the elastic stiffness constant. By doping at least one of the core and the cladding such that the first acoustic wave propagation velocity of the core is greater than the second acoustic wave propagation velocity of the cladding such that the acoustic waves and, in particular, the fundamental mode of the acoustic waves is not confined within and guided through the core. Instead, the optical fiber 20 of the present invention anti-guides the acoustic waves such that the acoustic waves are permitted to radiate laterally or radially out of the core and through the cladding toward the exterior surface of the cladding.

In order for the core 22 and the cladding 24 to have the desired indices of refraction and the desired acoustic wave propagation velocities, the core and/or the cladding must be appropriately doped. In this regard, the core can include aluminum oxide as a dopant. In addition to or instead of doping the core with aluminum oxide, the cladding can be doped with either fluorine or boron oxide.

By guiding the optical waves while antiguiding the acoustic waves, the optical fiber 20 of the present invention prevents significant mode overlap between the fundamental optical and acoustic modes within the core 22 which otherwise facilitates the coupling of energy from the forward propagating optical wave into a longitudinal acoustic wave which, in turn, can reflect the optical mode back towards the source by means of stimulated Brillouin scattering. In other words, the optical fiber reduces the overlap integral by spreading the acoustic mode much broader than the optical mode, thereby delaying the onset of stimulated Brillouin scattering.

The optical fiber 20 of the present invention is also designed, however, to prevent or otherwise alter the reflection of the acoustic waves from the exterior surface of the cladding 24 since the unaltered reflection of the acoustic waves by the exterior surface of the cladding would otherwise cause the acoustic mode profile to only weakly fall off with radial distance from the longitudinal axis of the optical fiber. In this regard, the optical fiber can be designed to prevent or otherwise alter reflections of the acoustic waves from the exterior surface of the cladding without correspondingly altering the optical waves propagating through the core 22 since the fundamental optical mode falls off much more quickly in the radial or lateral direction than the fundamental acoustic mode. For example, the amplitude of the fundamental optical mode is typically down by over three orders of magnitude at the exterior surface of the cladding from its value along the longitudinal axis of the optical fiber due to the exponential radial decay of the fundamental optical mode in the cladding.

According to one embodiment, the optical fiber 20 of the present invention therefore further includes an irregular coating 26 disposed on the cladding 24. The irregular coating varies in a lengthwise direction in order to alter the mode profile of the acoustic waves. Preferably, the irregular coating is comprised of an acoustically dampening material that is acoustically matched to the cladding. Thus, acoustic waves that reach the interface between the cladding and the coating will continue to propagate radially or laterally outward into the coating so as to be dampened therein. While a variety of materials are acoustically dampening and can be acoustically matched to the cladding, the irregular coating is preferably formed of a material that can be readily mechanically coupled to the exterior surface of the cladding, such as by physical vapor deposition, chemical vapor deposition, epoxy adhesion, metallization and soldering, photolithography or liquid or vapor etching or that can be extruded along with the core and cladding of the optical fiber. For example, the irregular coating of one embodiment is formed of chalk-fast orange resin, while the coating of other embodiments is a composite material consisting of a plurality of particles embedded in a matrix, such as a plurality of lead particles embedded in a matrix of poly(methyl methacrylate) (PMMA) or a plurality of tungsten particles embedded in an epoxy or in room temperature vulcanization (RTV) silicone, that can be extruded along with the core and the cladding.

In addition to being formed of an acoustically dampening material, the coating 26 is irregular so as to vary in a lengthwise direction along the optical fiber 20 such that in the acoustic waves that are reflected by the coating or from the interface between the cladding 24 and the coating toward the core 22 do not substantially contribute to the fundamental acoustic mode within the core. In this regard, the irregular coating can couple the fundamental acoustic mode into higher order acoustic modes which provide little, if any, power for stimulated Brillouin scattering. In addition, the irregular coating can incoherently scatter acoustic energy back into the cladding and the core in order to actually interfere with the fundamental acoustic mode. In this regard, due to the irregularities of the coating, the phase of the acoustic wave reflected at one location along the length of the optical fiber will generally be different than the phase of the acoustic wave reflected at another location along the length of the optical fiber in order to cause at least some interference between the various acoustic modes. As such, the reflected acoustic waves may create a fundamental acoustic mode having a non-planer phase front within the core of the optical fiber, such as a fundamental acoustic mode having side lobes of opposite polarity which substantially reduce the overlap integral between the fundamental optical and acoustic modes within the core, thereby increasing the threshold at which stimulated Brillouin scattering commences.

As depicted in FIG. 3, the irregular coating 26 can have a lateral thickness that varies randomly in a lengthwise direction in order to alter the mode profile of the acoustic waves. In addition to or instead of having a lateral thickness that varies randomly in the lengthwise direction, the irregular coating can have a density that varies randomly in the lengthwise direction in order to also alter the mode profile of the acoustic waves. As depicted in FIG. 4, the irregular coating of the optical fiber of another embodiment includes a plurality of segments that are spaced apart in the lengthwise direction that have the same lateral thickness, but different lengths. The plurality of segments can have respective lengths that are randomly selected or that are selected in another manner. For example, the plurality of segments of the irregular coating of the embodiment of FIG. 4 can have lengths that are related to one another by ratios of prime number, such as 3:7, 7:19, 1:5 and the like. As depicted in FIG. 5, the optical fiber 20 of another embodiment includes an irregular coating that also has a plurality of segments that can be either the same or different lengths, but that are spaced apart in a lengthwise direction by gaps 27 of different lengths. In this embodiment, the gaps can have lengths that are randomly selected or that are related to one another in some other manner. As described above in conjunction with the plurality of segments of FIG. 4, the gaps can have respective lengths that are related to each other by ratios of prime numbers. In either embodiment, however, the plurality of segments that are separated by respective gaps also serve to alter the mode profile of the acoustic waves.

While the irregular coatings 26 of the embodiments of the optical fibers 20 depicted in FIGS. 3-5 and described above are effective in order to alter the mode profile of the acoustic waves in a manner that increases the threshold at which stimulated Brillouin scattering commences, the optical fiber of the present invention can include other features in addition to or instead of the irregular coating in order to similarly alter the mode profile of the acoustic waves. In this regard, the optical fiber can include a quarter wave layer 28 disposed on and extending lengthwise along the cladding 24, as shown in FIG. 6. Like the irregular coating, the quarter wave layer is preferably formed of a material that is acoustically dampening and that is acoustically matched to the cladding. For example, the quarter wave layer can be formed of a glass or a plastic, such as silicon dioxide. The quarter wave layer has a thickness that equals an odd multiple at a quarter of a predetermined Brillouin scattering wavelength. In this regard, the predetermined Brillouin scattering wavelength is generally one to a few micrometers, such as about 1.1 microns. The quarter wave layer therefore effectively serves as an anti-reflectance coating on the cladding in order to promote radial or lateral radiation of the fundamental acoustic mode away from the core 22. As such, the optical fiber of this embodiment also serves to reduce the magnitude of the fundamental acoustic mode within the core and thereby increases the threshold at which stimulated Brillouin scattering would commence. In some embodiments, the optical fiber may include both a quarter wave layer and an irregular coating, typically with the irregular coating disposed upon the quarter wave layer.

FIG. 7 depicts another embodiment of the optical fiber 20 of the present invention which does not include a coating or other structure on the cladding 24, but which is, instead, designed such that cladding itself has a lateral thickness that varies irregularly in a lengthwise direction. In this regard, the thickness of the lateral thickness of the cladding can vary randomly or in some other irregular manner along the length of the optical fiber. Due to the irregular lateral thickness of the cladding, the optical fiber of this embodiment also serves to alter the mode profile of the acoustic waves so as to further increase the threshold at which simulated Brillouin scattering commences. In this regards, the phase of the acoustic signals reflected by the exterior surface of the cladding at different locations along the length of the optical fiber will be different such that the reflected acoustic waves interfere with one another and contribute little, if any, to the fundamental acoustic mode within the core 22 of the optical fiber. While the optical fiber of FIG. 7 does not include any type of coating over the cladding, the optical fiber of this embodiment can include both a cladding with an irregular lateral thickness as well as a coating, such as an irregular coating 26 or a quarter wave layer 28 disposed on the cladding.

Other techniques can also be implemented in conjunction with the optical fiber 20 of the present invention in order to further couple power away from the fundamental acoustic mode that otherwise supports the stimulated Brillouin scattering process. For example, shear waves can be externally generated and applied to the optical fiber so as to propagate laterally or radially through the optical fiber. The shear waves will also couple power away from the fundamental longitudinal acoustic mode and correspondingly increase the threshold at which stimulated Brillouin scattering will occur.

The optical fiber 20 of the present invention therefore provides an increased threshold for the commencement of stimulated Brillouin scattering relative to conventional optical fibers. As such, the optical fiber of the present invention can be utilized to deliver optical signals having increased power levels relative to conventional optical fibers and is therefore particularly suitable for applications, such as high power fiber optic industrial lasers and scalable high power fiber optic phased array laser systems, that require the transmission of optical signals having power levels well above the threshold for stimulated Brillouin scattering of conventional optical fibers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical fiber having an elevated threshold for stimulated Brillonin scattering comprising:

a longitudinally extending core having a first index of refraction and a first acoustic wave propagation velocity;

a cladding surrounding said core and extending lengthwise therealong, said cladding having a second index of refraction that is less than the first index of refraction of said core, said cladding also having a second acoustic wave propagation velocity that is less than the first acoustic wave propagation velocity in order to guide optical waves through said core while antiguiding acoustic waves; and an irregular coating disposed on said cladding that varies in a lengthwise direction in order to alter a mode profile of the acoustic waves, wherein said irregular coating has a lateral thickness that varies randomly in a lengthwise direction.

2. An optical fiber having an elevated threshold for stimulated Brillonin scattering comprising:

a longitudinally extending core having a first index of refraction and a first acoustic wave propagation velocity;

a cladding surrounding said core and extending lengthwise therealong, said cladding having a second index of refraction that is less than the first index of refraction of said core, said cladding also having a second acoustic wave propagation velocity that is less than the first acoustic wave propagation velocity in order to guide optical waves through said core while antiguiding acoustic waves; and an irregular coating disposed on said cladding that varies in a lengthwise direction in order to alter a mode profile of the acoustic waves, wherein said irregular coating comprises a plurality of segments having different lengths that are spaced apart in a lengthwise direction.

3. An optical fiber having an elevated threshold for stimulated Brillonin scattering comprising:

a longitudinally extending core having a first index of refraction and a first acoustic wave propagation velocity;

a cladding surrounding said core and extending lengthwise therealong, said cladding having a second index of refraction that is less than the first index of refraction of said core, said cladding also having a second acoustic wave propagation velocity that is less than the first acoustic wave propagation velocity in order to guide optical waves through said core while antiguiding acoustic waves; and an irregular coating disposed on said cladding that varies in a lengthwise direction in order to alter a mode profile of the acoustic waves, wherein said irregular coating comprises a plurality of segments that are spaced apart in a lengthwise direction by gaps of different lengths.

4. An optical fiber having an elevated threshold for stimulated Brillouin scattering comprising:

a longitudinally extending core having a first index of refraction and a first acoustic wave propagation velocity; and a cladding surrounding said core and extending lengthwise therealong, said cladding having a second index of refraction that is less than the first index of refraction of said core, said cladding also having a second acoustic wave propagation velocity that is less than the first acoustic wave propagation velocity in order to guide optical waves through said core while antiguiding acoustic waves, wherein said cladding has a lateral thickness that varies irregularly in a lengthwise direction in order to alter a mode profile of the acoustic waves.

5. An optical fiber according to claim 4 further comprising an irregular coating disposed on said cladding that varies in a lengthwise direction in order to alter the mode profile of the acoustic waves.

6. An optical fiber according to claim 5 wherein said irregular coating is comprised of an acoustically dampening material that is acoustically matched to said cladding.

7. An optical fiber according to claim 4 further comprising a quarter wave layer on and extending lengthwise along said cladding, said quarter wave layer having a thickness that equals an odd multiple of a quarter of a predetermined Brillouin scattering wavelength in order to permit lateral radiation of at least some of the acoustic waves.

8. An optical fiber according to claim 4 wherein said cladding comprises a dopant selected from the group consisting of fluorine and boron oxide.

9. An optical fiber having an elevated threshold for stimulated Brillouin scattering comprising:

a longitudinally extending core having a first index of refraction and a first acoustic wave propagation velocity;

a cladding surrounding said core and extending lengthwise therealong, said cladding having a second index of refraction that is less than the first index of refraction of said core, said cladding also having a second acoustic wave propagation velocity that is less than the first acoustic wave propagation velocity in order to guide optical waves through said core while antiguiding acoustic waves; and a quarter wave layer disposed on and extending lengthwise along said cladding, said quarter wave layer having a thickness tat equals an odd multiple of a quarter of a predetermined Brillouin scattering wavelength in order to permit lateral radiation of at least some of the acoustic waves.

10. An optical fiber according to claim 9 wherein said cladding has a lateral thickness that varies irregularly in a lengthwise direction in order to alter a mode profile of the acoustic waves.

11. An optical fiber according to claim 9 wherein said cladding comprises a dopant selected from the group consisting of fluorine and boron oxide.

* * * * *